July 13, 1937.  K. MAYBACH  2,086,723
CHANGE SPEED GEAR
Filed Aug. 19, 1936  8 Sheets-Sheet 1

Inventor:
Karl Maybach
By Watson, Coit, Morsel & Grindle
Attorneys.

July 13, 1937.  K. MAYBACH  2,086,723
CHANGE SPEED GEAR
Filed Aug. 19, 1936  8 Sheets-Sheet 2

Inventor:
Karl Maybach
By Watson, Coit, Morse & Grindle Attys.

July 13, 1937.    K. MAYBACH    2,086,723
CHANGE SPEED GEAR
Filed Aug. 19, 1936    8 Sheets-Sheet 3

Inventor:
Karl Maybach
By Watson, Coit, Morse & Grindle
Attorneys.

July 13, 1937.　　　　K. MAYBACH　　　　2,086,723
CHANGE SPEED GEAR
Filed Aug. 19, 1936　　　8 Sheets-Sheet 4

Inventor:
Karl Maybach
By Watson, Coit, Morse & Grindle
Attorneys

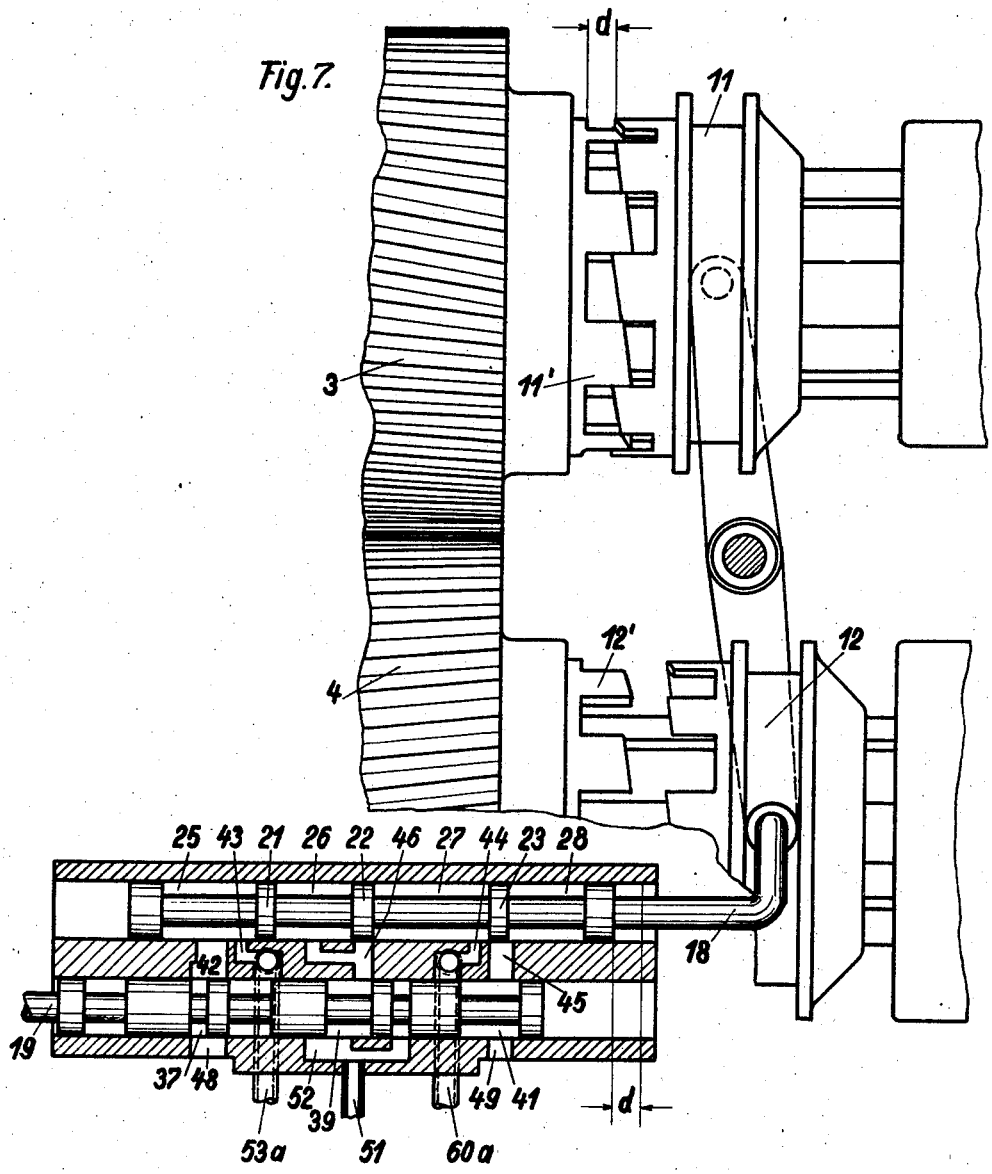

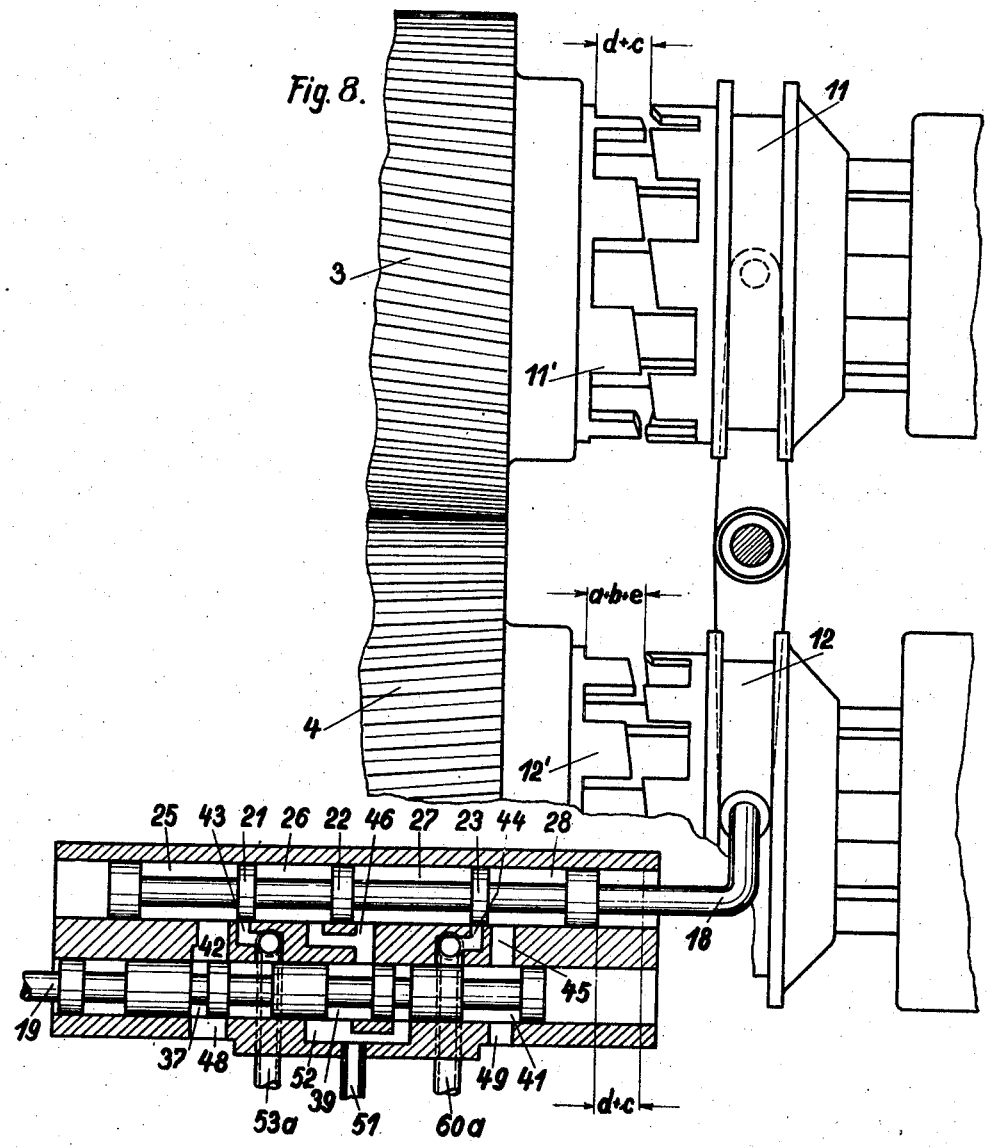

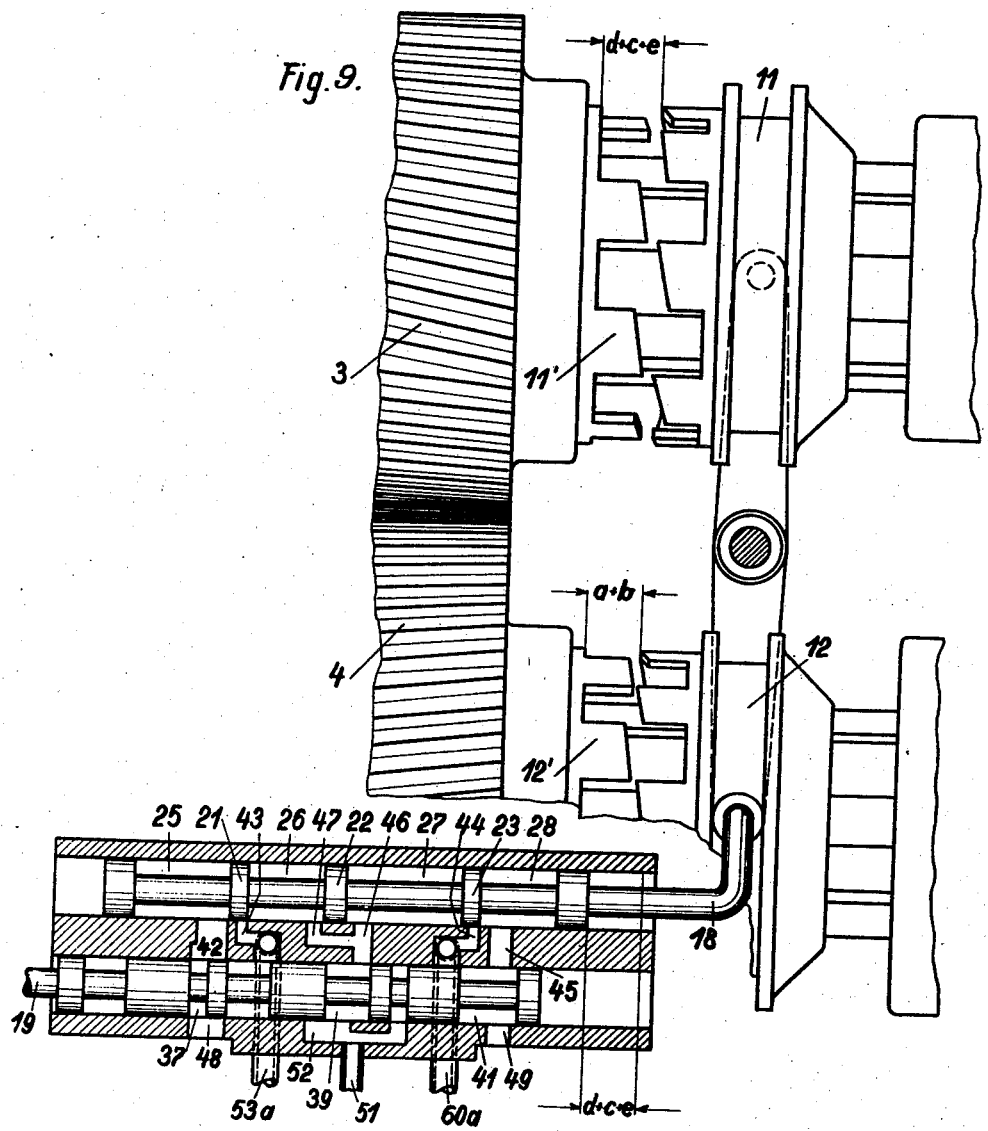

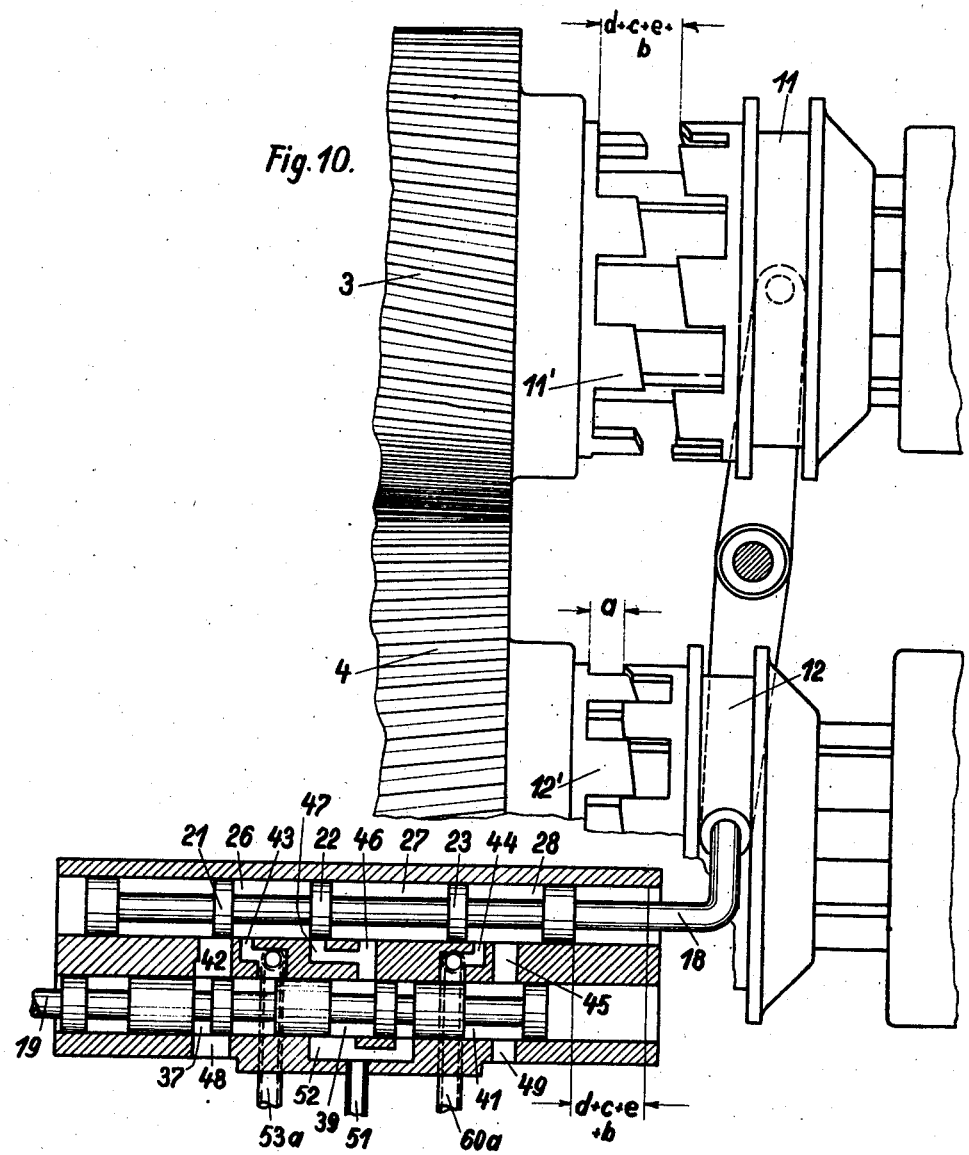

Patented July 13, 1937

2,086,723

UNITED STATES PATENT OFFICE 2,086,723

CHANGE-SPEED GEAR

Karl Maybach, Friedrichshafen-on-the-Bodensee, Germany, assignor to Maybach-Motorenbau, G. m. b. H., Friedrichshafen-on-the-Bodensee, Germany, a company of Germany Application August 19, 1936, Serial No. 96,870
In Germany August 8, 1934

23 Claims. (Cl. 192—.01)

The invention relates to a gear-changing device for gear-wheel change-speed gears, particularly for motor vehicles, the transmissions of which are engaged and disengaged by dog-clutches.

For such change-speed gears, gear-changing devices are already known, in which a slidable clutch member is connected to an auxiliary device which allows a retarding device to be operative on the more rapidly rotating clutch member. Furthermore, for such change-speed gears, gear-changing devices have been proposed wherein a slidable clutch member is connected to an auxiliary device which increases the speed of the clutch member connected to the engine, for example by altering the adjustment of the throttle valve. The auxiliary devices of these gear-changing devices may consist of mechanical devices comprising levers and tension and pressure members or electrical devices or control devices for a liquid or gaseous pressure medium.

As compared with this prior art, the gear-changing device according to the invention is characterized by the provision of both an auxiliary device for retarding and also an auxiliary device for accelerating the clutch members, and in that the slidable clutch member of each dog-clutch is connected to one of the auxiliary devices, either with the retarding device or with the accelerating device, according to the relative speed before engagement with regard to the corresponding second clutch member. Conveniently, each dog-clutch is at the same time connected to a control member for a pressure medium operative in the auxiliary devices (with pressure or vacuum, for which for example compressed air or a vacuum produced by the suction of the engine or by a special pump may be employed), by means of which the auxiliary device is controlled in accordance with the position of the slidable clutch member.

The gear-changing device according to the invention may be constructed in a particularly advantageous and simple manner in the case of gears having pairs of dog-clutches operated alternatively. In such gears, the slidable clutch members of each change-speed clutch are connected to a control member which effects the supply and discharge of an auxiliary force both to and from a retarding device and an accelerating device for the clutch members to be engaged.

Advantageously, the arrangement is furthermore such that some of the control members, in addition to effecting the control of the auxiliary force for the clutch with which they are connected, also effect the supply and discharge of the auxiliary force for the auxiliary devices to the control members of the other change-speed clutches. Such gear-changing devices are employed above all in gears in which the clutch-dogs are provided with bevelled faces, so that upon the approach of the clutch members for carrying out the gear-changing operation, the said bevelled portions repel the clutch members from each other until the originally more rapid clutch member begins to become the slower clutch member.

By the provision of the gear-changing device according to the invention both with an auxiliary device for retarding and also an auxiliary device for accelerating the clutch members to be engaged, and by the provision of the control members for the retarding and accelerating device in the manner indicated, an absolutely satisfactory, rapid gear-changing effect of the gear is attained, together with a simplification of the operation and complete relief of the driver and hence a greater reliability in operation. In the gear-changing operation of the gears which have already long been known and which comprise a plurality of constant-mesh pairs of gear-wheels and main shafts comprising a plurality of shaft elements, excessive demands have to some extent still been made on the ability and the feel of the driver. To some extent also, gear-changing occupied too much time, which in these vehicles resulted in inconveniences. For the first time, the gear-changing device according to the invention enables these gears to be generally employed so that their advantages can be fully utilized.

Two constructional examples of the device according to the invention are shown in the accompanying drawings, wherein.

Figure 4:
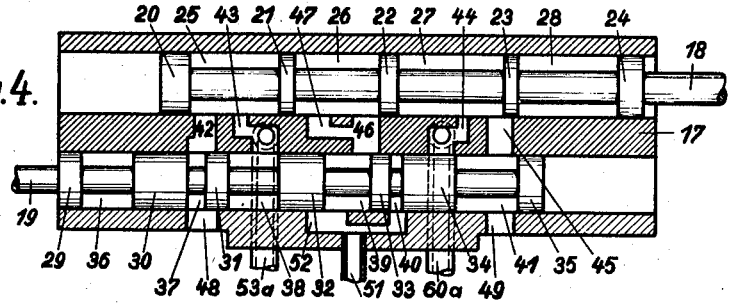
Figure 5:
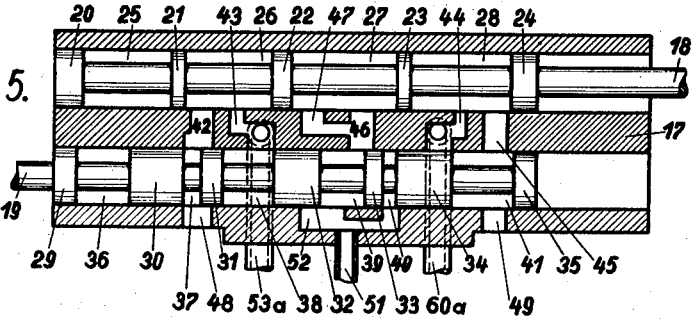
Figure 6:
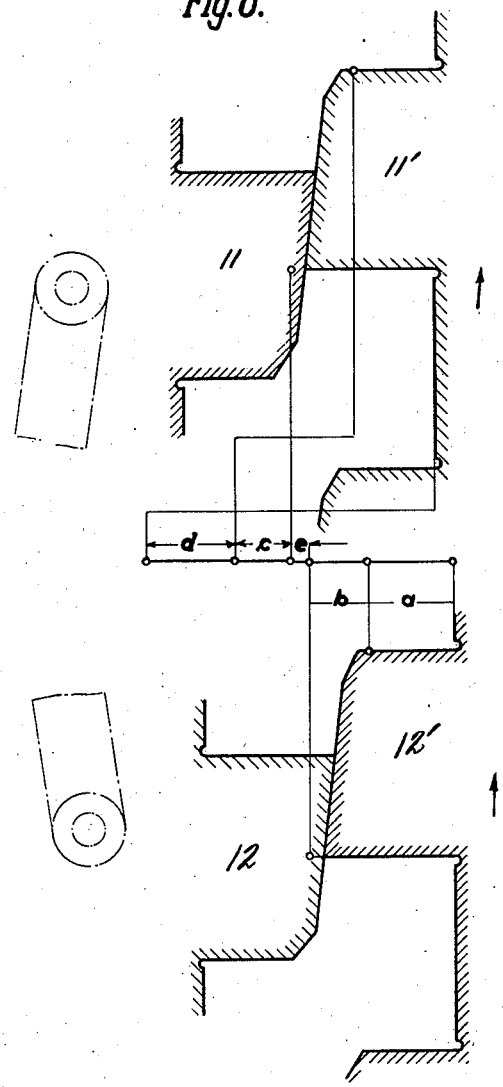
Fig. 6 shows a diagram representing the control effect of the valves with the bevelled dog-clutch teeth in the rejecting position.

Figs. 7 to 10, inclusive, show the various positions of the control valves and clutches corresponding to the various paths a, b, e, c, d, shown in Fig. 6 in changing from third speed (Fig. 4) to fourth speed (Fig. 5).

Figure 11:
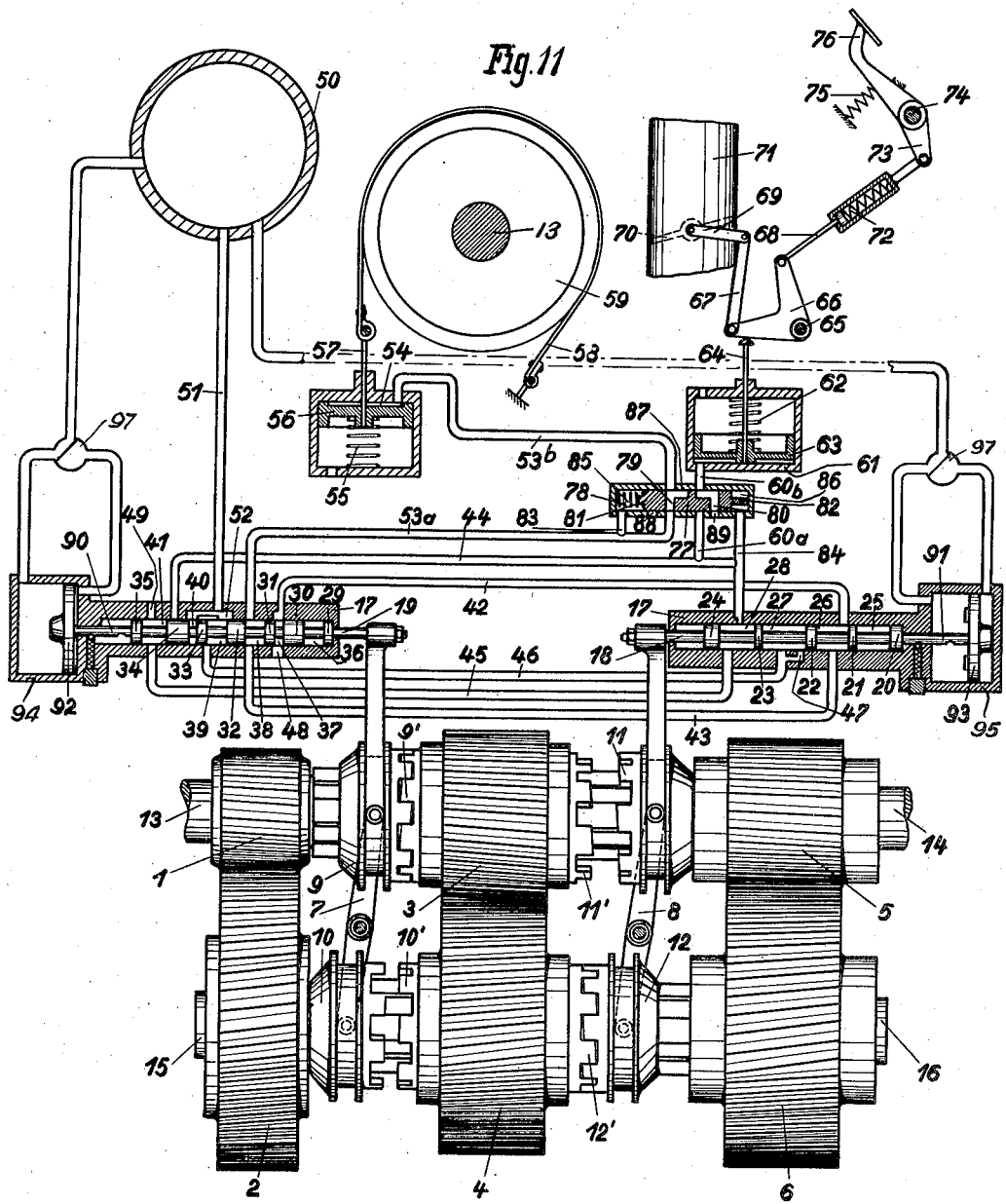

Fig. 11 shows a second constructional form of the invention, in which the control valves of the auxiliary devices form a part of the piston rods of the servo-motors for operating the speed clutch.

Figure 1:
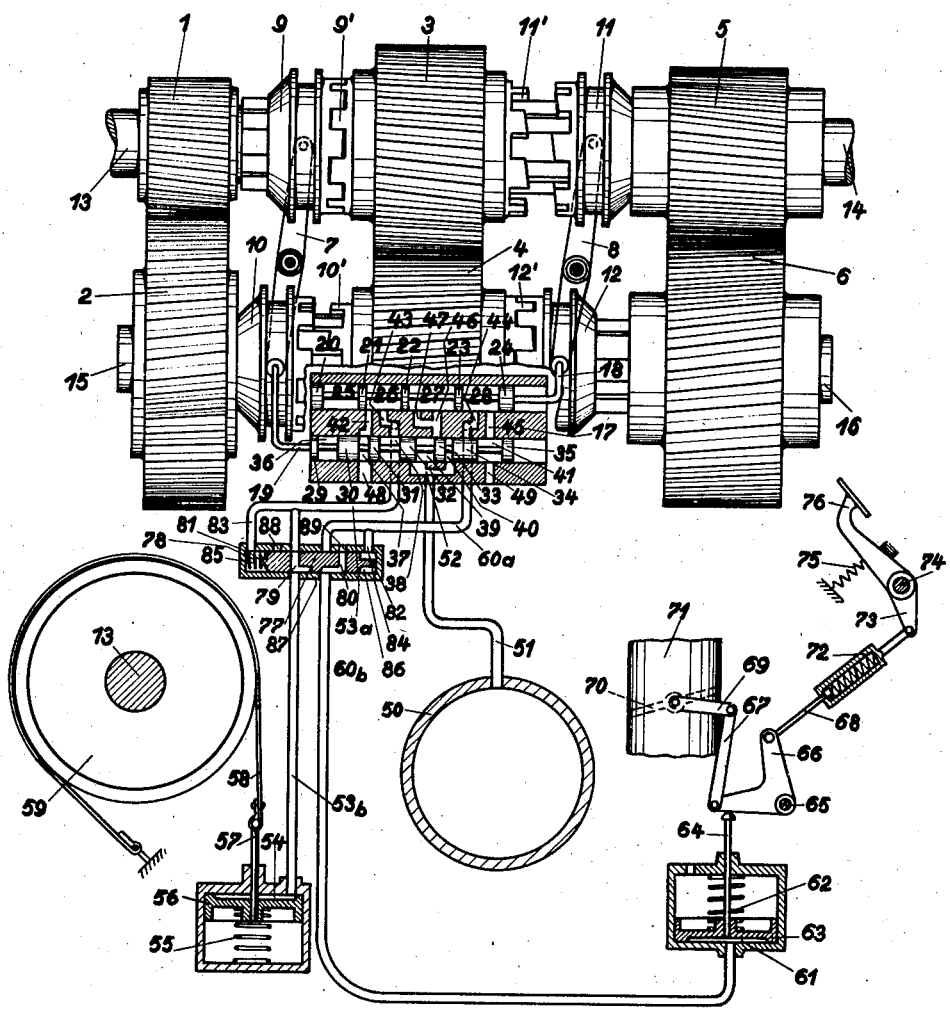
Fig. 1 shows a gear-changing device according to the invention applied to a change-speed gear having three pairs of constant mesh gear wheels and two pairs of dog-clutches, situated between the said pairs of gear wheels and connected together in pairs.

In Fig. 1 is shown a change-speed gear having three pairs of constant mesh gear-wheels 1, 2; 3, 4 and 5, 6 and two pairs of dog-clutches, situated between the said pairs of gear-wheels and each connected together by a common connecting lever 7 and 8 respectively, the slidable clutch members whereof are denoted by 9, 10, 11, 12 and the clutch members connected to the gear-wheels are denoted by 9', 10', 11' and 12'. The gear-wheel 1 is fast on the driving shaft 13 and the gear-wheel 5 is fast on the driven shaft 14. On the shaft 13, in addition, the clutch member 9 is slidable but non-rotatable and on the shaft 14 the clutch member 11 is slidable but non-rotatable. The lay shaft comprises two shaft elements 15 and 16. On the shaft element rigidly connected to the gear-wheel 2 the clutch member 10 is slidable but non-rotatable, and on the shaft element 16 rigidly connected to the gear wheel 6, the clutch member 12 is slidable but non-rotatable. The gear-wheels 3 and 4 are each mounted to rotate loosely, the gear 3 being journalled upon the adjacent ends of shafts 13 and 14 while the gear 4 is similarly journalled upon the adjacent ends of shafts 15 and 16. The following four speeds can be attained by means of this gear:

*1st speed.*—Driving shaft 13, gear-wheel 1, gear-wheel 2, shaft element 15, clutch 10, 10', gear-wheel 4, gear-wheel 3, clutch 11', 11, driven shaft 14.

*2nd speed.*—Driving shaft 13, gear-wheel 1, gear-wheel 2, shaft element 15, clutch 10, 10', gear-wheel 4, clutch 12', 12, shaft element 16, gear-wheel 6, gear-wheel 5, driven shaft 14.

*3rd speed.*—(Direct): Driving shaft 13, clutch 9, 9', gear-wheel 3, clutch 11', 11, driven shaft 14.

*4th speed.*—Driving shaft 13, clutch 9, 9', gear-wheel 3, gear-wheel 4, clutch 12', 12, shaft element 16, gear-wheel 6, gear-wheel 5, driven shaft 14.

In a casing 17 mounted on the gear-casing are two control slide valves 18 and 19 situated parallel to each other. The valve 18 is positively connected to the slidable clutch member 12 and comprises the piston elements 20—24 inclusive with the spaces 25—28 inclusive situated therebetween. The control valve 19 is connected to the slidable clutch member 10 and comprises the piston elements 29—35 inclusive with the spaces 36—41 inclusive situated therebetween. Between the two control valves 18 and 19, there are provided in the casing 17, ports 42—45 inclusive and also a port 46 with a branch 47. Furthermore, the casing 17 has two air-release holes 48, 49 and a connecting hole for the conduit 51 leading to a compressed air container 50 and situated in front of a longitudinal passage 52 provided in the casing 17.

A conduit 53a, 53b branching off from the port 43 leads to a cylinder space 54, in which slides a piston 56 under the action of a spring 55 and having its piston rod 57 constructed as tension member for the brake band 58 of a brake 59 mounted on the driving shaft 13. The spring 55 has the tendency to move the piston 56 upwardly.

in which position of the piston the brake band 58 is released.

A conduit 60a, 60b branching off from the port 44 leads to a cylinder space 61, in which slides a piston 63 under the action of a spring 62 and the piston rod 64 whereof controls a bell-crank lever 66 rotatable about a pivot 65. Pivoted to the bell-crank lever 66 are two links 67, 68, one 67 of which is in its turn pivotally connected to the lever arm 69 of the throttle valve 70 of the carburetter 71. The other link 68 forms in co-operation with a telescopic spring member 72 a flexible connection with the rearward extension 73 of the accelerator pedal 76 rotatable about a pivot 74 and loaded by a compression spring 75 in the direction for closing the carburetter throttle valve.

The conduits 53a, 53b and 60a, 60b of the two auxiliary devices are both under the influence of a common shut-off slide valve 77. The shut-off valve 77 is loaded on its left-hand end face by a spring 78 and has two passages 79, 80, so arranged that the valve 77 in one of its end positions connects the conduit sections 53a and 53b together and simultaneously closes the passage from conduit section 60a to conduit section 60b, while in its other end position it connects the conduit sections 60a and 60b together and simultaneously closes the passage from conduit section 50a to conduit 50b. The two end positions of the valve 77 are determined by stops 81 and 82 on the end faces of the valve. The valve 77 is moved either by the medium flowing in the conduit 53a, 53b or by the medium flowing in the conduit 60a, 60b. For this purpose, there is provided on each conduit section 53a, 60a, a branch 83, 84, of which the branch conduit 83 opens into the space 85 in front of the valve 77 and the conduit branch 84 opens into the space 86 behind the valve 77. The valve casing 87 has two air-release holes 88 and 89 which are situated in the range of movement of the slide valve passages 79 and 80 so that if, for example, as in the case of the right-hand end position of the valve 77 shown in Fig. 1, the passage 79 establishes communication between the conduit sections 53a and 53b, the conduit section 60b is connected by the passage 80 to the air-release hole 89 while in the left-hand end position of the valve 77, the conduit section 53b is connected by the passage 79 to the air-release opening 88.

The device according to the invention operates as follows:

As will be seen from Fig. 1, the movement of the control valves 18 and 19 is dependent upon the movement of the slidable clutch members 12 and 11 and also 10 and 9. Hence the control effects of these slide valves and the influence of the pressure medium also depend upon the movement of the said clutch members.

Figure 2:
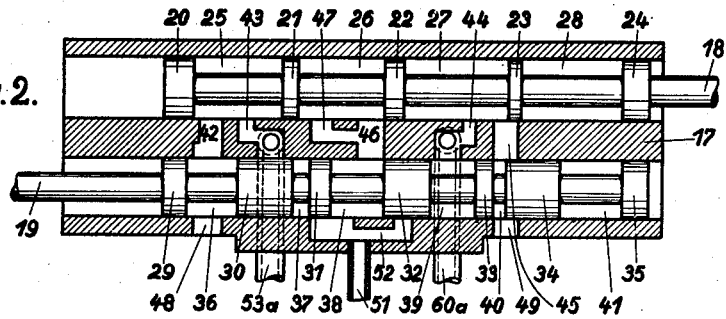
Figs. 2 to 5 show the auxiliary device for the gear-changing device according to Fig. 1 in detail on a larger scale, the four different control valve positions corresponding to the four speeds of the gear.

When the first speed is engaged (by means of the gear-wheels 1, 2, 4, 3) the clutch member 10 is in engagement with the clutch member 10' on the gear-wheel 4 and the clutch member 11 with the clutch member 11' on the gear-wheel 3, while the clutch members 9 and 12 are out of engagement. Consequently, both valves 18 and 19 lie in their right-hand end position (Fig. 2) and the conduit 60a is connected to the outer air by the passage 44, space 27 in the control valve 18, passage 45, space 40 in the control valve 19 and the hole 49, and the conduit section 53a is also connected to the outer air by the passage 43, space 25 in the valve 18, passage 42, space 36 in the valve 19 and opening 48. The valve 77 is under the pressure of the spring 78 in the right-hand end position shown in Fig. 1, in which it connects the conduit sections 53a and 53b together and connects the conduit section 60b to the outer air by the passage 80 and the hole 89.

Figure 3:
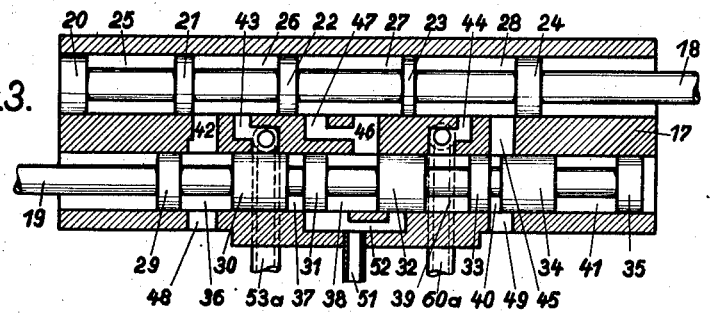

In Fig. 3 the valve position for the 2nd speed (gear-wheels, 1, 2, 4, 6, 5) is shown. In this case, likewise, the clutch member 10 is in engagement with the clutch member 10'. The valve 19 therefore again assumes its right-hand end position whilst the valve 18 this time is moved towards the left, since in this speed the clutch member 12 is engaged with the clutch member 12' on the gear-wheel 4. The conduit 60a is connected to the outer air in the same way as in the 1st speed, the space 28 merely having taken the place of the space 27 due to the movement of the valve 18 to the left. The conduit section 53a likewise remains connected to the outer air, the space 26 having merely taken the place of the space 25 as compared with the position in the 1st speed.

When the 3rd speed is engaged (Fig. 4), the valve 18 is in its right-hand position, as in the 1st speed, since in this case the clutch member 11 is in engagement with the clutch member 11' on the gear-wheel 3. In the case of this speed, the valve 19 is in its left-hand position, since the clutch member 9 engages the clutch member 9' on the gear-wheel 3. The conduit section 60a is connected to the outer air as in the case of the 1st speed. The space 41 has merely taken the place of the space 40. The conduit section 53a is likewise connected to the outer air, as in the 1st speed, the space 37 having merely taken the place of the space 36.

In the 4th speed, (gear-wheels 3, 4, 6, 5) the clutch members 9 and 12 are engaged with the corresponding clutch members 9', 12' on the gear-wheels 3 and 4 as shown in Fig. 1. Fig. 5 shows the corresponding valve position, the valves 18 and 19 being both in their left-hand position. Both the conduit section 60a and the conduit section 53a are connected to the outer air as in the case of the 3rd speed (Fig. 4), the space 28 in the valve 18 having merely replaced the space 27, and the space 26 having merely replaced the space 25.

In the valve positions shown in Figs. 2, 3, 4 and 5, the valve 77 always occupies the same position as shown in Fig. 1, since as follows from the foregoing, the spaces 85 and 86 at the ends of the valve 77 are always connected with the air-release holes.

As previously stated, the paths of the two control valves 18 and 19 and the control effects produced thereby are closely connected to the paths of the corresponding clutch members. This relationship is illustrated diagrammatically in Fig. 6, which shows, by way of example, the several paths of travel of the valve 18 corresponding respectively to the several phases of operation involved in disconnecting clutch members 11, 11', and connecting clutch members 12, 12', and likewise corresponding to the positions illustrated in Figs. 7 to 10, inclusive. On the path d—c which is given in the diagram (Fig. 6), the valve 18 moves for example from the right-hand end position (Fig. 4) to the left to an extent such that the left-hand edge of the piston element 21 just reaches the left-hand edge of the passage 43. This position of the control valve 18 is shown in Fig. 8. The air-release path through the spaces and ports 48, 37, 42, 25 to 43 is thereby closed and instead thereof, as soon as the overlap path e has been completed, that is to say, the right-hand edge of the piston element 21 commences to uncover the passage 43 at its right-hand edge, the conduit section 53a is connected by the port 43, space 26, port 47, space 39 and passage 52 to the conduit 51 from the pressure medium container 50. During the entire path b of the valve 18 this communication with the pressure medium container remains. At the end of the path b (Fig. 10), the left-hand edge of the piston element 22 will have attained the left-hand edge of the port 47 and thus will shut off the admission of pressure medium from the port 47 into the space 26. At the commencement of the section of path a which is now beginning, the piston element 21 is in such a position that its right-hand edge begins to uncover the right-hand edge of the port 42, and the latter connects the conduit section 53a to the outer air again through the port 43 and the space 26, and the said conduit also remains in communication therewith to the end of the path a of the valve.

If it is assumed that during the above described movement of the valve 18 from the right to the left, the valve 19 is in its left hand end position, that is to say, upon passing from the 3rd speed (valve position Fig. 4) to the 4th speed (valve position Fig. 5) the conduit section 53a, during the path d—c (Figs. 7 and 8) remains connected at first with the outer air, as just described through the spaces and ports 43, 25, 42, 37, 48. After travelling over the overlap path e (Fig. 9), the communication of the conduit 53a with the compressed air container 50 is established, as described hereinbefore, through the spaces and ports 43, 26, 47, 39, 52, and conduit 51, and this communication remains throughout the entire valve path b (Fig. 10). Due to the air pressure acting in the space 85 (Fig. 1) against the left-hand end face of the valve 77 and supplied from the conduit 53a, 83, together with the pressure of the spring 78, the valve 77 is held in its right-hand end position, thereby connecting the conduit section 53a to the conduit section 53b through the port 79 in the valve 77. Throughout the valve path b, the brake band 58 thereby remains applied by the air pressure acting from above upon the piston 56. In other words, in all positions of the dog clutch member 12 which correspond to the valve path b (rejection path of the dogs), the clutch member 12' connected to the driving shaft 13 will be braked. This continues until the speed of the two clutch members 12 and 12' is the same, and in consequence of the reversal of the relative direction of rotation, the dogs of the clutch member 12 begin to enter the gaps in the clutch member 12', that is to say, in travelling over the path a, they move from the position shown in Figure 10 to the position shown in Figure 11. The control valve 18 is thereby moved from the position shown in Figure 10 into its left hand end position as shown in Figure 5. From the commencement of this path a onward, as described hereinbefore, the conduit section 53a is in communication with the outer air through the spaces and ports 43, 26, 42, 37, 48 and remains in communication with the outer air even when the valve 18 has attained its left-hand position and the dogs of the clutch member 12 have entered fully into the gaps of the clutch member 12'.

During the aforesaid path of the valve 18 from the right to the left, after the portion of path d (Figs. 6 and 7) also the conduit section 60a, first connected as described hereinbefore with the outer air will have been connected during the valve path c (Fig. 8) for a short moment to the compressed air supply from the conduit 51 through the spaces and ports 52, 39, 46, 27, 44, by the fact that the left-hand edge of the piston element 23 reached the left-hand edge of the passage 45 and thereby closed the communication with the outer air through 45, 41, 49 and the right-hand edge of the piston element 22 uncovered the right-hand edge of the passage 46. At the end of the valve path c (Fig. 8), the left-hand edge of the piston element 23 reaches the left-hand edge of the port 44 and hence cuts off the supply of compressed air to the port 44 and to the conduit section 60a. After the completion of the safety path e (Fig. 9), during the further valve path b—a (Figs. 5 and 10), the conduit section 60a remains in communication with the outer air through the port 44, space 28, port 45, space 41 and hole 49. The paths d, c and e which corresponds to the movement of the clutch member 11 from engagement with the clutch member 11', are travelled over very quickly, so that the described communication of the cylinder 61 to the compressed air supply is effective for too short a time to produce a movement of the piston 63. Shortly after the commencement of the valve path b (Fig. 10), the clutch member 12 is in the rejection position relatively to the clutch member 12', the retarding device being operative as described hereinbefore.

In a similar manner as in the foregoing for the passage from the 3rd to the 4th speed, the control effect of the auxiliary device and hence the effect of the retarding device also takes place upon passing from the 1st to the 2nd speed (valve positions of Figs. 2 and 3), as follows immediately from the figures.

On passing from the 2nd to the 3rd speed (valve positions Figs. 3 and 4), the valve 19 will be moved out of its right-hand position into its left-hand position, and the valve 18 from its left-hand position into its right-hand position. Both the slidable clutch member 10 and also the slidable clutch member 12 will thereby be brought out of engagement and the slidable clutch members 9 and 11 will be applied against their counter-clutch members 9' and 11'. It is here immaterial which of these clutches is first released and which is first engaged. Assuming that the clutch member 10 first comes out of engagement and the end faces of the clutch member 9 are applied to those of the clutch member 9', while the clutch member 12 is still in engagement with the clutch member 12', the valve 19 will first be moved out of its right-hand position to the left. At the same time, after moving over the valve paths a, b and e (Fig. 6), the right-hand edge of the piston element 31 will begin to uncover the right-hand edge of the port 43, that is to say, compressed air will be supplied to the conduit section 53a along the path 51, 52, 38, 43. The port 42 will have been shut off from the air-release hole 48 by the piston element 30. Compressed air will be supplied from the conduit section 53a through the conduit branch 83 also to the space 85, and the valve 77 will thereby be forced into its right-hand position, so that its passage 79 connects the conduit section 53a to the conduit section 53b. The space 54 of the cylinder of the retarding device will therefore have compressed air supplied to it and the retarding device will reduce the speed of the clutch member 9. This supply of compressed air continues during the path c of the valve 19.

In general, under the action of the retarding device, the clutch 9, 9' will first come into engagement. If, however, as long as this has not yet taken place, the clutch 12 in the meantime has come out of engagement with the clutch member 12' and the clutch 11 has come into the rejection position with respect to the clutch member 11', that is to say the valve 18 is moved to the right out of its left-hand position, the latter first travels over the path d shown in the diagram in Fig. 6. At this moment, the left-hand edge of the piston element 22 of the valve 18 opens the port 47, so that compressed air can likewise pass from the container 50 to the conduit section 53a through the conduit 51, the right-hand part of port 52, space 39, port 46, 47, space 26 and port 43, since the right-hand edge of the piston element 32 in accordance with the movement of the valve 19 during the rejection path of the dogs, continuously opens more or less the port 46 at the lower right-hand mouth thereof. As described hereinbefore, due to the movement of the valve 19, the conduit section 53a also has compressed air supplied to it on the path 51, 52, 38, 43. At the same time, the right-hand edge of the piston element 21 has shut off the port 42 from the space 26 and the path to the open air is therefore also closed by the said valve 18.

The said supply of compressed air through the port 46 and the valve 18 to the conduit section 53a remains only for a short moment, since the clutch member 12 rapidly comes out of engagement and moves over the rejection path c.

At the end of the valve path c, the piston element 21 closes the port 43 at its right-hand edge. Upon the further movement of the valve 18 to the right, the port 43, after being uncovered by the left-hand edge of the piston element 21, is connected through the space 25 to the port 42, which, as assumed, is at first still shut off by the piston element 30 of the valve 19. At the commencement of the path b of the valve 18, the clutch member 11 now stands in the rejection position with respect to the clutch member 11'. The clutch member 11 is rotating more rapidly than the clutch member 11', since of course the second speed was previously engaged. The end faces of the clutch member 11 now come into contact with those of the clutch member 11'. The valve 18 has now moved so far to the right that the left-hand edge of the piston element 23 uncovers the left-hand edge of the port 44. The conduit section 60a is thereby connected to the conduit 51 and to the compressed air container 50 through the spaces and ports 44, 27, 39, 52.

The valve 77, however, at first remains in its right-hand position, since the compressed air from the conduit section 53a and the conduit branch 83, acting against its left-hand end face, together with the pressure of the spring 78, overcomes the air pressure acting on its right-hand end face. Only when the speed of the clutch member 9 has dropped until the latter is overtaken by the clutch member 9' and comes into engagement with the latter, will the valve 19 be drawn simultaneously into its left-hand end position in which, as described herenbefore, the conduit section 53a is in communication with the outer air. The retarding device is thereby also rendered inoperative. The pressure in the space 85 also escapes and the valve 77 is moved to the left against the force of the spring 78 by the air pressure issuing from the branch conduit 84. The conduit section 53b is thereby connected to the open air through the path 79, 88 and the conduit section 60a is connected to the conduit section 60b by the port 80. Compressed air can now enter the chamber 61 of the cylinder of the accelerating device through the path 51, 52, 39, 46, 27, 44, 60a, 60b, and thereby the throttle valve 70 is opened.

The speed of the engine and hence that of the clutch member 12' is now accelerated until the latter overtakes the clutch member 12 and both clutch members come into engagement with each other. The valve 18 thereby travels over the closure path a after the rejection path b and arrives in the right-hand end position shown in Fig. 4, in which as previously described, the cylinder 61 of the accelerating device is connected to the outer air by the conduit 60a, 60b and the ports and spaces 44, 27, 45, 41, 49. The fourth speed is now engaged.

If the valve 19 is not moved from the positions shown in Fig. 3 into the positions shown in Fig. 4 before the valve 18 as described in the foregoing, but the valve 18 passes from the positions in Fig. 3 to the positions in Fig. 4 before the valve 19, then by means of the same compressed air paths and spaces, the accelerating device first becomes operative and the clutch member 11 is thereby brought into engagement with the clutch member 11', and only after the retarding device has become operative, will the clutch member 9 be brought into engagement with the clutch member 9'. The valve 77, if the conduit section 60a has compressed air supplied to it first, will be forced into its left-hand end position under the action of the pressure acting against its right-hand end face and supplied by the conduit 84 branching off the conduit section 60a. The port 80 therefore connects the conduit section 60a with the conduit section 60b. The conduit section 53a on the contrary is closed and the conduit section 53b is connected to the outer air through the path 79, 88.

If during the operation of the accelerating device, compressed air is supplied to the conduit 53a, then in the manner described hereinbefore, the valve 77 will be forced into its right-hand end position under the action of the compressed air acting on its left-hand end face together with the spring 78, and in consequence of the connection of the conduit sections 53a and 53b with each other through the port 79, the retarding device will first become operative. Only after the corresponding lowering of the speed of the clutch member 9 and the engagement thereof with the clutch member 9', will the conduit section 53a be connected to the outer air. The valve 77 will thereby be forced back into its left-hand end position under the action of the compressed air acting upon its right-hand end face, the conduit section 60a will be connected with the conduit section 60b by the port 80 and the accelerating device will increase the speed of the clutch member 11' until the clutch member 11 comes into engagement with 11', whereupon the conduit section 60a will be again put into communication with the outer air and the valve 77 will also return into its right-hand end position.

In a similar manner as in the foregoing for changing from a lower speed to a higher speed, changing from a higher speed to a lower speed will take place, the auxiliary device effecting in the same way, according to the clutch which is coming into engagement, for example on passing from the 2nd to the 1st speed or from the 4th to the 3rd speed, the acceleration of the clutch member connected to the engine. On passing from the 3rd to the 2nd speed, the retarding device or the accelerating device will first be operative, according to which clutch member first comes out of engagement into the rejection position, and thereafter the other of these two devices will be operative.

Also in gear-changing with the omission of an intermediate speed, for example from the 1st to the 3rd, or the 4th speed or from the 4th to the 2nd or 1st speed, the operation of the auxiliary device is effected in fundamentally the same way as described hereinbefore.

Fig. 11 likewise shows a change-speed gear with three constant-mesh gear wheel pairs 1, 2; 3, 4 and 5, 6 and two intermediate pairs of dog clutches which are connected together by a common connecting lever 7 and 8 respectively and the slidable clutch members whereof are shown at 9, 10, 11, 12 and the clutch members connected to the gear wheels are shown at 9', 10', 11' and 12'. The gear wheel 1 is fast on the driving shaft 13 and the gear-wheel 5 is fast on the driven shaft 14. On the shaft 13, in addition, the clutch member 9 is slidable but non-rotatable and on the shaft 14 the clutch member 11 is slidable but non-rotatable. The lay shaft comprises two shaft elements 15 and 16. On the shaft element rigidly connected to the gear-wheel 2 the clutch member 10 is slidable but non-rotatable, and on the shaft element 16 rigidly connected to the gear wheel 6, the clutch member 12 is slidable but non-rotatable. The gear-wheels 3 and 4 are each mounted to rotate loosely. By means of this gear, the same four speeds can be obtained as with the gear according to Fig. 1. The movement of the movable clutch members 9', 10', 11' and 12' is effected in known manner by servo-motors. Whereas however in the change-speed gear according to Fig. 1, two separate control valves are provided in a single casing, the control valves 18 and 19, each arranged in a casing 17 in the constructional form according to Fig. 11 are structurally combined with the piston rods 90 and 91 respectively of the pistons 92 and 93 of these servo-motors or form a part of said piston rods 90 and 91. In the present instance, servo-motors 94, 95 are connected by suitable conduits to the compressed air container 50, and are controlled by valves 96 and 97, respectively.

The control valve 18 forming a part of the piston rod 91 consists of the piston elements 20 to 24 with the intermediate spaces 25 to 28. The control valve 19 forming part of the piston rod 90 consists of the piston elements 29 to 35 with the intermediate spaces 36 to 41. The two control valves 18 and 19 are connected by the conduits 42 to 45 and also by the conduit 46 and a branch 47 in the casing 17. Furthermore, the casing 17 has two air-release holes 48, 49 and a connecting hole for the conduit 51 leading to a compressed air container 50 and situated in front of a longitudinal passage 52 provided in the casing 17.

A conduit 53a, 53b branching off from the conduit 42 leads to a cylinder space 54, in which slides a piston 56 under the action of a spring 55 and having its piston rod 57 constructed as tension member for the brake band 58 of a brake 59 mounted on the driving shaft 13. The spring 55 has the tendency to move the piston 56 upwardly, in which position of the piston the brake band 58 is released.

A conduit 60a, 60b branching off from the conduit 44 leads to a cylinder space 61, in which slides a piston 63 under the action of a spring 62 and the piston rod 64 whereof controls a bell-crank lever 66 rotatable about a pivot 65. Pivoted to the bell-crank lever 66 are two links 67, 68, one 67 of which is in its turn pivotally connected to the lever arm 69 of the throttle valve 70 of the carbureter 71. The other link 68 forms in co-operation with a telescopic spring member 72 a flexible connection with the rearward extension 73 of the accelerator pedal 76 rotatable about a pivot 74 and loaded by a compression spring 75 in the direction for closing the carbureter throttle valve.

The conduits 53a, 53b and 60a, 60b of the two auxiliary devices are both under the influence of a common shut-off slide valve 77. The shut-off valve 77 is loaded on its left-hand end face by a spring 78 and has two passages 79, 80, so arranged that either the passage 79 opens or closes the passage from the conduit section 53a to the conduit section 53b or the passage 80 opens or closes the passage from the conduit section 60a to the conduit section 60b, according to whether the valve 77 occupies its right-hand or left-hand end position. The two end positions of the valve 77 are determined by stops 81 and 82 on the end faces of the valve. The valve 77 is moved either by the medium flowing in the conduit 53a, 53b or by the medium flowing in the conduit 60a, 60b. For this purpose, there is provided on each conduit section 53a, 60a a branch 83, 84, of which the branch conduit 83 opens into the space 85 in front of the valve 77 and the conduit branch 84 opens into the space 86 behind the valve 77. The valve casing 87 has two air-release holes 88 and 89 which are situated in the range of movement of the slide valve passages 79 and 80 so that if, for example, as in the case of the righthand end position of the valve 77 shown in Fig. 11, the passage 79 establishes communication between the conduit sections 53a and 53b, the conduit section 60b is connected by the passage 80 to the air-release hole 89 while in the left-hand end position of the valve 77, the conduit section 53b is connected by the passage 79 to the air-release opening 88.

The operation of the change-speed gear shown in Fig. 11 is as follows:

In the third speed, the clutch members 9 and 9' and the clutch members 11 and 11' are in engagement. In this case, the control valve 18 occupies its left hand end position and the control valve 19 occupies its right hand end position. If now it is intended for example to change from the third speed to the fourth speed shown in Fig. 11, the clutch members 9 and 9' still remain in engagement, while the clutch 11, 11' is disengaged and the clutch 12, 12' must be engaged with simultaneous movement of the control valve 18 from its left hand end position into its right hand end position. For this purpose the valve 97 is manipulated so as to admit compressed air to the space on the left of the piston 93, whereby this piston 93, in the same way as described in connection with the gear changing operation shown in Figs. 4, 7, 8, 9, 10, and 5, is moved to the right by an amount corresponding to the paths d, c and e shown in Fig. 6. Immediately after passing over the path e, that is to say at the commencement of the path b, which corresponds to the path of refusal of the dogs, the left hand edge of the piston element 21 uncovers the left hand edge of the conduit 43. The conduit 53a is thereby connected via the space 38, conduit 43, space 26, passage 47, conduit 46, space 39 and passage 52 to the conduit 51 coming from the pressure medium container 50. This connection remains during the entire path b of the control valve 18. The pressure medium supplied to the conduit 53a passes through the branch conduit 83 into the space 85 on the left of the valve 77, whereby the latter retains its right hand end position. By this means also the supply of pressure medium from the conduit 53a to the conduit 53b and the space 54 above the piston 56 is ensured via the passage 79. The piston 56 is forced downwardly, whereby the brake band 58 is applied and the clutch member 12' connected to the driving shaft 13 is braked.

As soon as the speed of the two clutch members 12 and 12' is the same and in sequence of the reversal of the direction of relative rotation, the dogs of the slidable clutch member 12 begin to enter the gaps of the clutch member 12', the refusal path b is ended. By means of the pressure medium still situated in the space on the left of the piston 93 of the servo-motor, the piston is moved to the right until the right hand end of the piston element 22 has reached the right hand edge of the passage 47 and hence has interrupted the supply of pressure medium from the container 50 to the conduit 53a or to the space 54. Upon the control valve 18 moving further to the right, the left hand edge of the piston element 21 slides over the left hand edge of the conduit 42. The conduit 42, which is in communication with the outer air via the aperture 48 and the space 37, is thereby connected to the conduit 43 and hence simultaneously the space 54 is connected to the outer air via the conduit 53b, passage 79, conduit 53a and space 38, and braking is terminated by the piston 56 returning to its upper position. This connection of the space 54 with the outer air remains during the movement of the piston 93 to its right hand end position, that is to say, during the entire path a shown in Fig. 6. The gear-changing operation is ended.

As described in the foregoing, the control paths of the device are so arranged that always first the retarding device and only after the cessation of the latter, the accelerating device is operative. In the case of the simultaneous operation of a plurality of dog-clutches, this prevents gear parts which are disconnected on the one hand from the drive and on the other hand from the gear shaft, from being able to stop and thereby causing difficulties.

I claim:

1. In a change-speed gear having a plurality of dog clutches, an auxiliary device for retarding the clutch members, an auxiliary device for accelerating the clutch members, and means for causing one or other of said auxiliary devices to act upon one member of each dog clutch before its engagement with the other member.

2. In a change-speed gear having a plurality of dog clutches, a fluid-pressure-actuated device for retarding the clutch members, a fluid-pressure-actuated device for accelerating the clutch members, a source of fluid pressure, and a fluid control member operatively connected with each sliding clutch member and arranged between said source and said devices.

3. In a change-speed gear having pairs of alternatively operated dog clutches, an auxiliary device for retarding the clutch members, an auxiliary device for accelerating the clutch members, and a control member operatively connected with each pair of sliding clutch members, said control members determining the beginning and ending of the action of said retarding and accelerating devices.

4. In a change-speed gear having pairs of alternatively operated dog clutches, a fluid-pressure-actuated device for retarding the clutch members, a fluid-pressure-actuated device for accelerating the clutch members, a source of fluid pressure, and a fluid control member operatively connected with each pair of sliding clutch members, said control members determining the beginning and ending of the action of said retarding and accelerating devices.

5. In a change-speed gear having pairs of alternatively operated dog clutches, an auxiliary device for retarding the clutch members, an auxiliary device for accelerating the clutch members, and a control member operatively connected with each pair of sliding clutch members, said control members operating together to determine the beginning and ending of the action of said retarding and accelerating devices for any given gear-changing operation.

6. In a change-speed gear having pairs of alternatively operated dog clutches and fluid-pressure-actuated pistons for the movement of the sliding clutch members, an auxiliary device for retarding the rotation of the clutch members, an auxiliary device for accelerating the rotation of the clutch members, and control members constituted by the piston rods of said pistons, said control members determining the beginning and ending of the action of said retarding and accelerating devices.

7. In a change-speed gear having pairs of alternatively operated dog clutches and fluid-pressure-actuated pistons for the movement of the sliding clutch members, an auxiliary device for retarding the rotation of the clutch members, an auxiliary device for accelerating the rotation of the clutch members, and control members constituted by piston rods extending on one side only of said pistons, said control members determining the beginning and ending of the action of said retarding and accelerating devices, and the control paths of the control members of the various speed clutches for each auxiliary device being connected in a sequence corresponding to the desired sequence of engagement of said clutches.

8. In a change-speed gear having pairs of alternatively operated dog clutches and fluid-pressure-actuated pistons for the movement of the sliding clutch members, an auxiliary device for retarding the rotation of the clutch members, an auxiliary device for accelerating the rotation of the clutch members, and control members constituted by piston rods extending on one side only of said pistons, said control members operating together to determine the beginning and ending of the action of said retarding and accelerating devices for any given gear-changing operation, the control paths of the control members of the various speed clutches for each auxiliary device being connected in a sequence corresponding to the desired sequence of engagement of said clutches.

9. In a change-speed gear having pairs of alternatively operated dog clutches, a fluid-pressure-actuated device for retarding the clutch members, a fluid-pressure-actuated device for accelerating the clutch members, a source of fluid pressure, a member operatively connected with each pair of sliding clutch members for controlling the supply of fluid to said devices, said control members determining the beginning and ending of the action of said retarding and accelerating devices, and a valve member associated with said control members for controlling the influence of the pressure medium on the accelerating and retarding devices to prevent the simultaneous operation thereof.

10. In a change-speed gear having pairs of alternatively operated dog clutches, a fluid-pressure-actuated device for retarding the clutch members, a fluid-pressure-actuated device for accelerating the clutch members, a source of fluid pressure, a member operatively connected with each pair of sliding clutch members for controlling the supply of fluid to said devices, said control members determining the beginning and ending of the action of said retarding and accelerating devices, and a valve member associated with said control members for controlling the influence of the pressure medium on the accelerating and retarding devices to prevent the simultaneous operation thereof, said change-over member being moved by the fluid pressure controlled by the control members.

11. In a change-speed gear having a plurality of dog clutches, an auxiliary device for retarding the clutch members, an auxiliary device for accelerating the clutch members, means for causing said auxiliary devices to act upon the clutch members, and means for ensuring that the retarding device always comes into action first and the accelerating device only comes into action thereafter.

12. In a change-speed gear having pairs of alternatively operated dog clutches, a fluid-pressure-actuated device for retarding the clutch members, a fluid-pressure-actuated device for accelerating the clutch members, a source of fluid pressure, and a fluid control member operatively connected with each pair of sliding clutch members, said control members determining the beginning and ending of the action of said retarding and accelerating devices and having such an arrangement of the control paths that the retarding device always comes into operation first and the accelerating device only comes into operation thereafter.

13. In a change-speed gear having a plurality of dog clutches and a main shaft train comprising a plurality of elements, each said clutch comprising two members carried respectively on two adjacent elements of said train, an auxiliary device for retarding the clutch members, an auxiliary device for accelerating the clutch members, and means for causing one or the other of said auxiliary devices to act upon an element carrying one member of each dog clutch before the engagement of such member with the other member.

14. In a change-speed gear having a plurality of dog clutches and a main shaft train comprising a plurality of elements, a fluid-pressure-actuated device for retarding the clutch members, a fluid-pressure-actuated device for accelerating the clutch members, a source of fluid pressure, and a fluid control member operatively connected with each clutch and arranged between said source and said devices.

15. In a change-speed gear having a plurality of dog clutches of the type having bevelled tooth end faces so that the clutch members repel each other until the originally more rapid member begins to become the slower member, an auxiliary device for retarding the clutch members, an auxiliary device for accelerating the clutch members, and means for causing one or the other of said auxiliary devices to retard or accelerate, as the case may be, one member of each dog clutch before its engagement with the other member.

16. In a change-speed gear having pairs of alternatively operated dog clutches of the type having bevelled tooth end faces so that the clutch members repel each other until the originally more rapid member begins to become the slower member, a fluid-pressure-actuated device for retarding the clutch members, a fluid-pressure-actuated device for accelerating the clutch members, a source of fluid pressure, and a fluid control member operatively connected with each pair of sliding clutch members, said control members determining the beginning and ending of the action of said retarding and accelerating devices.

17. In a change-speed gear having pairs of alternatively operated dog clutches of the type having bevelled tooth end faces so that the clutch members repel each other until the originally more rapid member begins to become the slower member, fluid-pressure-actuated pistons for moving the sliding clutch members, an auxiliary device for retarding the rotation of the clutch members, an auxiliary device for accelerating the rotation of the clutch members, and control members constituted by the piston rods of said pistons, said control members determining the beginning and ending of the action of said retarding and accelerating devices.

18. In a change-speed gear having pairs of alternatively operated dog clutches of the type having bevelled tooth end faces so that the clutch members repel each other until the originally more rapid member begins to become the slower member, a fluid-pressure-actuated device for retarding the clutch members, a fluid-pressure-actuated device for accelerating the clutch members, a source of fluid pressure, a member operatively connected with each pair of sliding clutch members for controlling the supply of fluid to said devices, said control members determining the beginning and ending of the action of said retarding and accelerating devices, and a valve member associated with said control members for controlling the influence of the pressure medium on the accelerating and retarding devices to prevent the simultaneous operation thereof.

19. In a change-speed gear having pairs of alternatively operated dog clutches of the type having bevelled tooth end faces so that the clutch members repel each other until the originally more rapid member begins to become the slower member, a fluid-pressure-actuated device for retarding the clutch members, a fluid-pressure-actuated device for accelerating the clutch members, a source of fluid pressure, and a fluid control member operatively connected with each pair of sliding clutch members, said control members determining the beginning and ending of the action of said retarding and accelerating devices, and having such an arrangement of the control paths that the retarding devices always comes into operation first and the accelerating device only comes into operation thereafter.

20. In a change-speed gear having pairs of alternatively operated dog clutches, a fluid-pressure-actuated device for retarding the clutch members, a fluid-pressure-actuated device for accelerating the clutch members, a source of fluid pressure, and a fluid control member operatively connected with each pair of sliding clutch members, said control members determining the beginning and ending of the action of said retarding and accelerating devices, and being arranged in a common casing and connected together by ports in the said casing.

21. In a change-speed gear having a main shaft train comprising a plurality of elements and having pairs of alternatively operated dog clutches of the type having bevelled tooth end faces so that the clutch members repel each other until the originally more rapid member begins to become the slower member, fluid-pressure-actuated pistons for the movement of the sliding clutch members, an auxiliary device for retarding the rotation of the clutch members, an auxiliary device for accelerating the rotation of the clutch members, control members constituted by piston rods extending on one side only of said pistons, said control members operating together to determine the beginning and ending of the action of said retarding and accelerating devices for any given gear-changing operation, means for ensuring that the retarding device always comes into action first and the accelerating device only comes into action thereafter, and a valve member associated with said control members for controlling the influence of the pressure medium on the accelerating and retarding devices to prevent the simultaneous operation thereof.

22. In a change-speed gear, a train of elements including pairs of alternatively operated clutches, each said clutch comprising two members carried respectively on two adjacent elements of said train, an auxiliary device for retarding the clutch members, an auxiliary device for accelerating the clutch members, a control member for effecting the supply and discharge of an auxiliary force both to and from the retarding and accelerating devices, the slidable member of each clutch being connected to such control member and a valve member movable by the auxiliary force itself for controlling the influence of the auxiliary force on the accelerating and retarding devices so as to prevent the concurrent operation thereof.

23. In a gear-changing device having a main-shaft train composed of a plurality of parts, pairs of alternatively operated dog clutches, each said clutch having a slidable member, pistons for moving the slidable members of the clutches by the action of a pressure medium, an auxiliary device for retarding the rotation of certain clutch members, an auxiliary device for accelerating the rotation of certain clutch members, piston rods secured to said pistons and constituting control members which effect the supply and discharge of an auxiliary force both to and from said retarding device and said accelerating device, and means cooperating with said control members for causing the retarding device always to come into operation first and the accelerating device to come into operation thereafter.

KARL MAYBACH.